Figure 1:
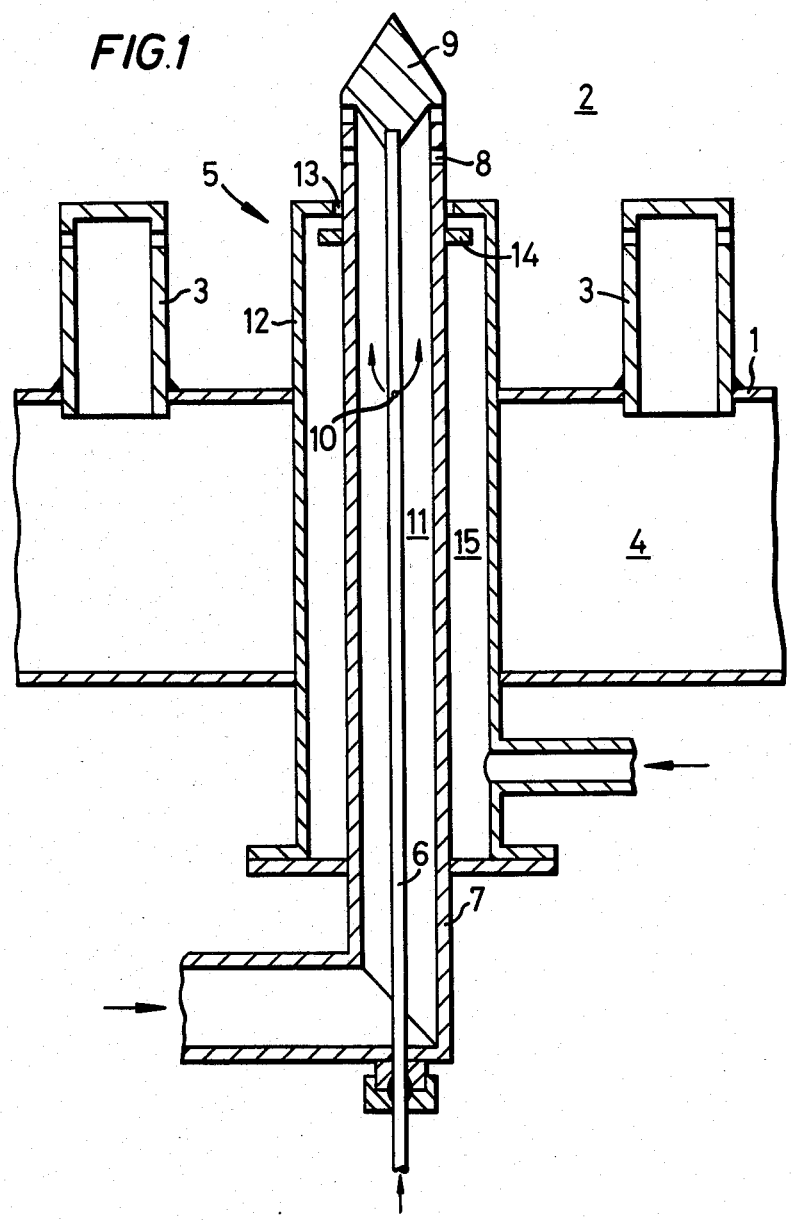

United States Patent [19]

Kelly et al.

[11] Patent Number: 4,627,812

[45] Date of Patent: Dec. 9, 1986

[54] FLUIDIZED BED COMBUSTOR

[75] Inventors: Felix T. Kelly, Bagshot; David C. Newey, Byfleet; Gordon W. Sutton, Bisley, all of England

[73] Assignee: The British Petroleum Company p.l.c., London, England

[21] Appl. No.: 835,430

[22] Filed: Mar. 3, 1986

Related U.S. Application Data

[63] Continuation of Ser. No. 661,268, Oct. 16, 1984, abandoned, which is a continuation of Ser. No. 384,925, Jun. 4, 1982, abandoned.

[30] Foreign Application Priority Data

Jun. 11, 1981 [GB] United Kingdom ............... 17964

[51] Int. Cl.$^4$ .................................. F23D 11/00
[52] U.S. Cl. ........................................... 431/7
[58] Field of Search ............... 431/6, 7, 170; 122/4 D; 110/263, 265; 422/139, 145; 432/58; 239/424; 34/57 R

[56] References Cited

U.S. PATENT DOCUMENTS

| 3,861,862 | 1/1975 | Steever et al. | 432/58 |
|---|---|---|---|
| 3,881,857 | 5/1975 | Hoy et al. | 431/7 |
| 3,981,690 | 9/1976 | Chen et al. | 48/73 |
| 4,021,193 | 5/1977 | Waters | 432/58 |
| 4,051,814 | 10/1977 | Jennings | 122/448 R |
| 4,338,074 | 7/1982 | Johansson | 431/6 |

FOREIGN PATENT DOCUMENTS

| AU495101 | 1/1977 | Australia . |
| ZA792007 | 4/1979 | South Africa . |
| 1521983 | 7/1975 | United Kingdom . |
| 1455892 | 11/1976 | United Kingdom . |
| 2044905 | 10/1980 | United Kingdom . |
| 2053018 | 7/1983 | United Kingdom . |

OTHER PUBLICATIONS

Canadian J. Chem. Eng. 52 Apr. 1974, pp. 129–144.

Primary Examiner—Randall L. Green
Attorney, Agent, or Firm—Morgan & Finnegan

[57] ABSTRACT

A method of starting up a fluidized bed combustor in which a gas containing oxygen is passed from an outlet beneath the level of the slumped bed to cause a spouting action above the level of the slumped bed. Liquid fuel is supplied from a nozzle adjacent to or located within the spout, and an ignition source applied to the bed. The liquid fuel and gas containing oxygen supply are regulated so as to fluidize at least part of the bed adjacent to the liquid fuel outlet and to obtain a controlled rise in the temperature of the bed until the hot fluidized condition is reached.

10 Claims, 3 Drawing Figures

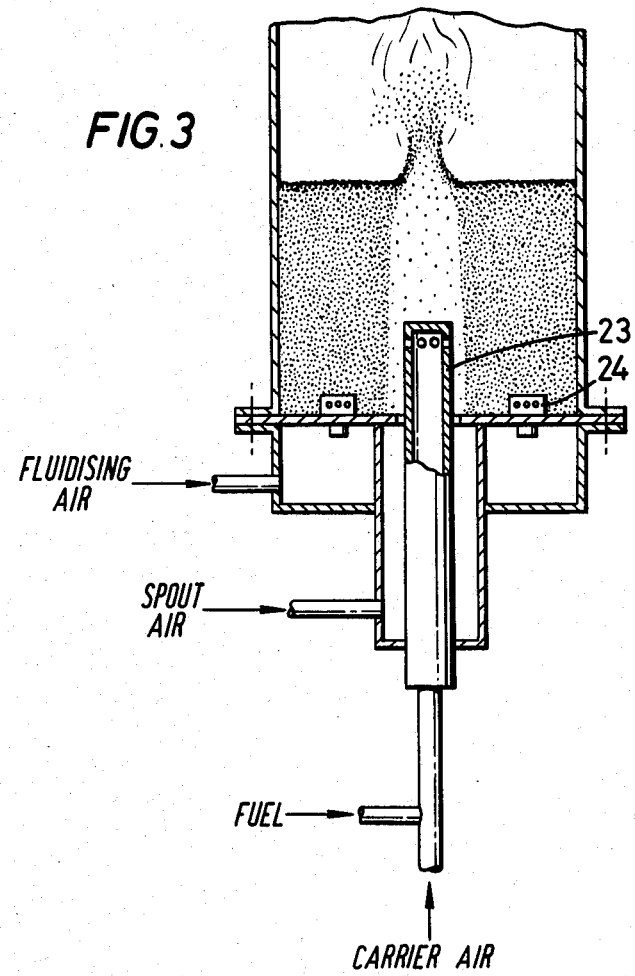

FLUIDIZED BED COMBUSTOR

This application is a continuation of application Ser. No. 661.268, filed 10/16/84 which is a continuation of U.S. Ser. No. 384,925 filed June 4, 1982, both abandoned.

The present invention relates to fluidised bed combustors and more particularly relates to the start-up of fluidised bed combusters.

At present there are several methods of starting up fluidised bed combustors. For example, (a) pre-mixed gaseous fuel and air are fed through the bed and ignited in the cold condition, the main fuel being introduced when the bed has reached the required fuel ignition temperature, (b) conventional oil fired burners may be played on to the surface of the fluidised bed, the main fuel again being introduced when the correct bed temperature has been attained or (c) hot gases from an external source can be passed through a localised area of the bed, the fuel and fluidising air being introduced when the correct bed temperature is attained. These methods are described in whole or in part in our GB patent nos. 1159310 and 1459766 and GB patent application no. 2044905. However, these methods have certain disadvantages. Thus, methods (a) and (b) require provision for storage and feed of a start up fuel, e.g. propane or gas oil, which adds to the cost and complexity of the fluid bed plant, method (b) may be slow and unreliable and method (c) in addition to requiring provision of hot gas from the external combustion source is required to be close to the distributor plate, the hot gas passing through the distributor plate resulting in localised expansion thereby adding to the cost and complexity of the assembly.

The present invention is directed towards a method of start up of a fluidised bed combuster which alleviates or overcomes some of the above disadvantages.

Thus according to the present invention there is provided a method of starting up a fluidised bed combustor comprising the steps of (a) passing a gas containing oxygen from an outlet beneath the level of the slumped bed to cause a spouting action above the level of the slumped bed, (b) supplying liquid fuel from a nozzle adjacent to or located within the spout, (c) applying an ignition source to the bed and (d) regulating the liquid fuel and gas containing oxygen supply so as to fluidise at least part of the bed adjacent to the liquid fuel outlet and to obtain a controlled rise in the temperature of the bed until the hot fluidised condition is reached.

Spouted bed technology comprises passing a high velocity stream of gas vertically upwards through a mass of solid particles. The high velocity gas stream causes the particles to ascend rapidly in a hollowed central spout within the bed. In addition to particle motion within the spout cone there is some particle back mixing in the area surrounding the cone giving a particle circulation pattern even outside the cone. The spouting action may have sufficient upward flow to create a fountain of particles above the static bed or in a deeper bed may give a very high circulation rate of solid particles within the cone and a normal fluidised bed above the cone. In each case a cycle of solid particle movement is established. The present invention uses the former phenomenon to create a fountain of particles above the slumped bed level.

According to a further aspect of the invention there is provided a nozzle suitable for use in a distributor plate of a fluidised bed combustor, the nozzle comprising an upwardly directed tube, the tube having lateral fuel outlets, liquid fuel supply means to the outlets and a gas discharge outlet adapted to direct an oxygen containing gas upwardly past the lateral fuel outlets, the gas discharge outlet being of a size to create an oxygen containing gas velocity to cause spouting in a slumped particulate bed.

The spout is preferably created by a gas discharge outlet in the form of an annular gap most preferably below and surrounding the liquid fuel outlets. In the case where the primary fuel, e.g. fuel oil, is injected into the bed using a carrier fluid such as air (as in the climbing oil film technique of GB patent no. 1368352), the flow rate of the spouting fluid is arranged to override the horizontal component of the carrier fluid otherwise the spout would not form or would be unstable. Also the height of the nozzle above the annular gap has an effect on the characteristics of the spout and in particular if this height is too great there appears to be a decrease in spout stability.

The liquid fuel may be supplied to the bed by the techniques described in our UK patent nos. 1368352, 1487391, 1502764, or alternatively, for example, the liquid fuel may be injected, in the form of a dispersed, fine, or atomised spray into the fluidising gas upstream of the air distributing nozzles and the resulting combustible mixture then fed to the bed via these nozzles or by any other suitable technique.

The fluidised bed combustor preferably comprises a distributor plate for supplying fuel and fluidising gas containing oxygen to the bed, the bed lying above the plate. The fluidising gas containing oxygen is generally a supply of air under pressure at ambient temperature. The liquid fuel is preferably a light oil such as gas oil or kerosene but may be a heavier fuel depending upon the supply conditions used. Liquid fuels may also include liquid waste materials.

The nozzle outlets for liquid fuel are preferably of the type disclosed in our GB patent nos. 1368352 and 1487391. The outlet heads of the nozzles can be of any suitable shape. The area of the nozzle outlets is designed to give good distribution of fuel and air. The nozzle density is varied to meet specific combustor requirements. The nozzle outlets preferably comprise lateral passageways through the sides of the nozzle body.

The fluidised bed comprises mineral particles of a size range and bulk density appropriate to the velocity of the fluidising gas. Suitable materials should include sand, dolomite and limestone or combinations of materials.

The fluidising air is generally supplied from one or more fans. When the bed is cold, a more powerful air supply is required for fluidisation when the bed is at it operating temperature. During start up, air is bled through the fuel supply nozzle outlets to prevent fall back of bed particles. The spout is then initiated by passing air through the annular gap and an overbed ignition pilot burner ignited. Fuel is then supplied from the nozzle outlets to the bed causing flash back when ignition is achieved. The spouting air velocity is then reduced and the air redirected to adjacent fluidising air nozzles to fluidise the bed. The combustor may be used for the combustion of other combustible materials, e.g. fossil fuels such as coal, and solid waste materials. Liquid fuels in addition to those used for start up may be fed through the central core of the nozzle as either a supplementary or main fuel heat source during normal combustion. The annular gap from which the spout is produced may be used for the feeding of fine solid fuels for cold and low temperature combustion start up.

The invention will now be described by way of example only and with reference to FIGS. 1 to 3 of the accompanying drawings in which FIG. 1 is a verticle section through part of the distributor plate of a fluidised bed combustor incorporating a nozzle assembly of the present invention.

Figure 2:
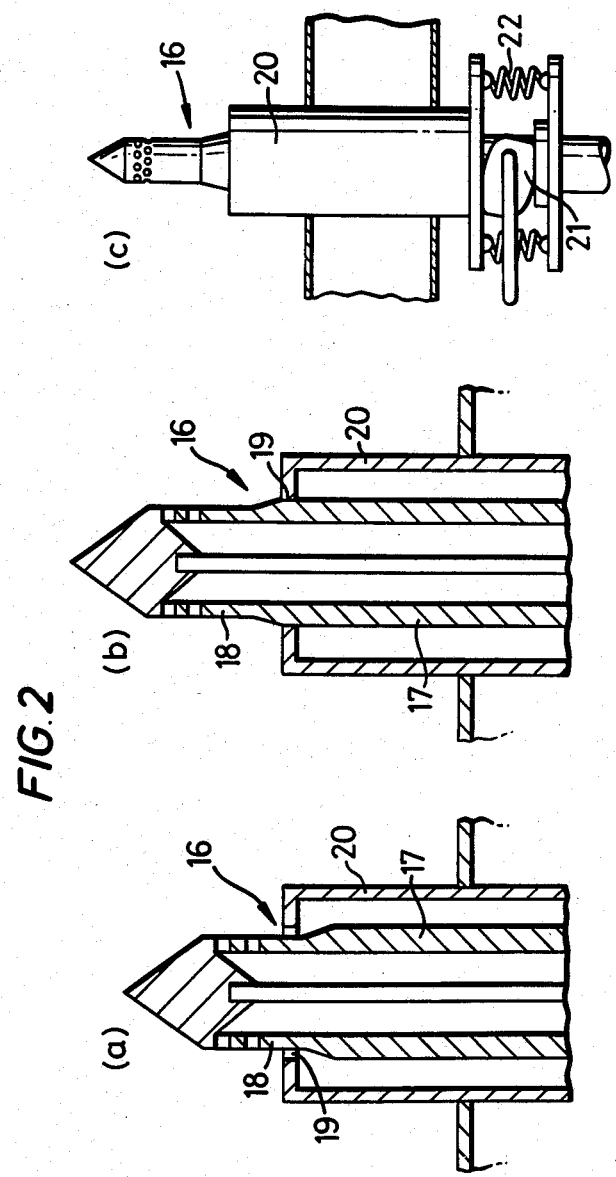

FIG. 2 are vertical sections through an alternative embodiment of a nozzle assembly according to the present invention and FIG. 3 is a verticle section through a fluidised bed combustor according to the present invention.

A fluidised bed combustor comprises a distributor plate 1 above which lies a bed of sand 2. The distributor plate 1 has a number of nozzles 3 each having outlets in the bed, the nozzles 3 being connected to an air supply from the plenum chamber 4.

The distributor plate 1 also has one or more nozzles indicated generally by numeral 5. The nozzle 5 is used to produce a spout in and above the slumped bed 2 and also to supply liquid fuel to the bed 2.

Nozzle 5 comprises a central liquid fuel injection tube 6 which is co-axial with a surrounding tube 7 which is used for climbing film oil injection and is connected to an air supply. The surrounding tube 7 has outlets 8 to the bed 2 and the liquid fuel injection tube 6 is connected to the surrounding tube 7 by means of the connecting member 9. The outlets 10 of the fuel injection tube 6 which discharge into the space 11 enclosed by the surrounding tube 7, are at a distance below the outlets 8 of the surrounding tube 7.

An outer jacket 12 is co-axial with and encloses the surrounding tube 7 from a point below the outlets 8 of the surrounding tube 7. The outer jacket 12 passes through and below the distributor plate 1 and is connected to an air supply. The upper part of the outer jacket 12 is spaced apart from the surrounding tube 7 so as to form an annular gap 13. This annular gap 13 when supplied with compressed air is capable of yielding a spout within and above the slumped bed level.

The outer surface of the surrounding tube 7 is provided with a circumferential flange 14 at a point just below the annular gap 13 in such a way that an angle of repose of the particles in the slumped bed 2 does not allow bed particles to slump back into the space 15 between the outer jacket 12 and surrounding tube 7 during combustor shut-down.

During use of the combustor, air is passed through the "climbing film nozzle" at a flow rate suitable for injection of the liquid fuel into the bed 2. Air is then passed into the bed 2 through the annular gap 13 to create a spout with a fountain of particles appearing above the level of the slumped bed 2. The pilot light burner (not shown) located above the bed is then lit. The liquid fuel oil is then passed into the bed 2 through the "climbing film" nozzle, so as to coat bed particles with oil which subsequently appear in the spout fountain.

The liquid fuel is thus ignited by the pilot burner, the flame striking back into the bed 2. At this stage, the air flow passing through annular gap 13 is reduced and the air flow diverted through adjacent fluidising gas nozzles 3 started or increased. As the temperature of the bed 2 increases, air flow to the fluidising gas nozzles 3 is increased with a concomitant reduction in spout air until the entire bed 2 is normally fluidised.

An alternative form of nozzle for use in the method according to the present invention is shown in FIG. 2. This nozzle reduces the tendency of bed material to fall back into the space between the outer jacket and outer tube when the spout air supply is terminated.

The nozzle 16 has an outer tube 17 which is capable of vertical movement, the outer tube 17 having an upper part 18 of smaller external diameter than the lower part. During spouting operation, the nozzle 16 takes position (a) in which the spouting annular gap is formed by the gap 19 between the outer jacket 20 and smaller diameter part 18 of the outer tube. During normal operation of the fluidised bed, that is, after start up using the spouting action, the outer tube 17 is raised so that its lower part abuts the outer jacket 20 (position (b)) so as to close the spouting annular gap 19. The figure 2 (c) illustrates a cam 21 and spring 22 mechanism to allow up and down movement of the outer tube 17.

The cross-sectional area of the annual gap 13 is less than the cross-sectional area of the gap between the surrounding tube 7 and the outer jacket 12 in order to (a) reduce the overall pressure drop across the gas flow system ie between the gas inlet and gas outlet and (b) to provide room for the circumferential flange 14 in the embodiment of FIG. 1 and the varying diameter tube 17 in the embodiment of FIG. 2, both being ways of reducing or eliminating the ingress of bed material between the tubes during bed slumping etc.

FIG. 3 shows a vertical section through a fluidised bed combustor having simplified start up facilities according to the invention. The combustor is of 80 mm diameter and uses a single nozzle 23 capable of spouted operation which is surrounded by a number of air only fluidising nozzles 24. Results obtained during start up of this fluidised combustor are shown in the Table. The experiments were carried out with six fluidising air only nozzles 24. The oil feed nozzle was in the form of a climbing film nozzle of the internal diameter 7 mm (as shown in FIG. 3) and having six 2 mm diameter lateral outlets. The gap width of the spouting annulus was 0.4 mm. The exit velocity of air from the oil nozzle was of the order 20 meters/sec and the spout air exit velocity was of the order 80 meters/sec when cold. The experimental conditions were as follows:

| Bed diameter | 80 mm |
| Bed material | 14–25 mesh sand (600–1200 microns) |
| Bed depth | 100 mm |
| Fuel | gas oil |
| Gas oil carrier gas | air at 20 liters/minute |
| Nozzle length above annular gap | 20 mms |
| Height of thermocouple No. 1 above distributor plate | 9.5 cm |
| No. 2 | 8 cm |
| No. 3 | 6 cm |
| No. 4 | 4.5 cm |
| No. 5 | 3 cm |
| No. 6 | 2 cm |

(Readings of thermocouples Nos. 1 and 2 were the same as for thermocouple No. 3).

A number of cold modelling experiments were also carried out to observe the effect of spout behaviour for various design and operating conditions. A perspex model fluidising chamber was constructed having an internal diameter of approximately 140 mm. The base or distributor plate which supported a bed of particles (molochite) of 16 to 25 mesh had a single central circular aperture. By using a solid bar centrally located in the aperture, it was possible to simulate the presence of a central climbing film oil nozzle having a surrounding annular gap. By passing air through the annular gap it was observed that a spout could be achieved. Cold experiments (in a larger apparatus on a bed of 60 cm diameter and up to 60 cm deep) have also shown that the horizontal component of the air supply (liquid fuel carrier gas) from the central climbing oil film nozzle must not be too large otherwise it interferes with the air flow from the annular gap and thereby renders the spout unstable or even destroys the spout.

The height of the nozzle 23 above the spout annular gap was also found to influence the stability of the spout. Experimentally it was found that the preferred height of the nozzle 23 above the spout annular gap was 5 cms or less.

TABLE

| Time (min) (sec) | Temperature (°C.) | | | | Spout flow (liters/min) | Fluidising flow (liters/min) | Fuel Pressure (p.s.i.) | Fuel flow (liter/hour) | Spout height (cms) |
| --- | --- | --- | --- | --- | --- | --- | --- | --- | --- |
| | No. 3 | No. 4 | No. 5 | No. 6 | | | | | |
| 0 (A) | 34 | | | | 85 | 5 | 13 | 6 | 20 |
| 15 (B) | | | | | | | | | |
| 20 | | | | | | | 5 | 2.5 | |
| 40 | | | | | | | 4 | 2.0 | |
| 50 | 74 | | | | 40 | 30 | | | 0 |
| 1.10 | | | | | 30 | 40 | | | |
| 1.35 | 140 | | | | 20 | | | | |
| 1.50 | | | | | | | 3 | 1.3 | |
| 2.20 | 184 | | | | 10 | 45 | | | |
| 3.00 | 430 | | | | | 50 | | | |
| 3.40 | 500 | 380 | | | | | | | |
| 4.40 | 584 | 540 | 360 | 280 | | | | | |
| 6.00 | 610 | 590 | 530 | 455 | | | 2.5 | 0.9 | |
| 7.15 | 638 | 622 | 588 | 532 | | | | | |
| 9.00 | 682 | 666 | 643 | 623 | | | | | |
| 9.45 | 705 | 688 | 665 | 646 | | 40 | | | |
| 11.40 | 763 | 743 | 716 | 691 | | | | | |
| 12.00 | | | | | | 30 | | | |
| 13.30 | 807 | 789 | 760 | 721 | | | | | |
| 15.10 | 847 | 828 | 798 | 760 | | | | | |
| 17.30 | 874 | 856 | 828 | 790 | | | | | |
| 19.00 | 887 | 869 | 846 | 809 | | | | | |
| 20.00 | 896 | 879 | 855 | 819 | | | | | |
| 22.15 | 908 | 891 | 873 | 843 | | | | | |
| | Carrier gas flow increased to 40 liters/minute to remove over bed burning | | | | | | | | |
| 24.00 | 922 | 912 | 898 | 865 | | | | | |
| 26.00 | 932 | 920 | 908 | 874 | | | | | |
| 29.00 | 940 | 928 | 918 | 883 | | | | | |

(A) = fuel supply started
(B) = fuel injection achieved

We claim:

1. A method of starting up a fluidized bed combustor comprising the steps of:
   (a) passing an oxygen containing gas from an outlet beneath the surface of a slumped bed of particulate material to cause a spout zone of particulate material above the surface of the slumped bed;
   (b) introducing liquid fuel from a nozzle within the bed into the effective spouting zone of the bed whereby a mixture of liquid fuel and oxygen containing gas is rapidly transported through the bed to the upper surface of the bed;
   (c) igniting the liquid fuel/oxygen containing gas mixture above the surface of the bed;
   (d) after ignition passing an oxygen containing gas into the bed to thereby obtain a controlled rise in the temperature of the bed until the entire bed is fluidized; and
   (e) decreasing the flow of oxygen containing gas causing the spout simultaneously with said controlled temperature rise and stopping the flow of oxygen containing gas causing the spout when the entire bed is fluidized.

2. A method according to claim 1 in which the oxygen containing gas in step (a) is introduced around the periphery of the nozzle to thereby form an annular spout.

3. A method according to claim 1 or claim 2 in which the liquid fuel is supplied to the nozzle by feeding the liquid fuel to the interior surface of the nozzle so as to form a climbing film of liquid fuel which subsequently emerges from the nozzle outlet into the fluidized bed.

4. A method according to claim 1 where step (d) and step (e) are performed simultaneously by passing an oxygen containing gas into the bed at a steadily increasing rate until the entire bed is fluidised while simultaneously decreasing the flow of oxygen containing gas causing the spout.

5. A method according to claim 1 in which the liquid fuel is injected in the form of a fine spray into the oxygen containing gas and passing the mixture through the outlet and into the spout.

6. A method according to claim 1 in which liquid fuel is fed to the bed for a short time prior to igniting the liquid fuel.

7. A method according to claim 1 in which the liquid fuel is kerosene or gas oil.

8. A method according to claim 1 in which the oxygen containing gas of step (b) is air.

9. A method according to claim 1 in which the fluidized bed combustor comprises a distributor plate for supplying the oxygen containing gas of paragraph (d) to the bed, the bed lying above the distributor plate.

10. A method according to claim 1 in which the liquid fuel is ignited by means of an auxiliary burner, a spark igniter or by passing propane gas and air through the nozzle and igniting the resultant combustible mixture at the bed surface.

* * * * *